Aug. 17, 1954     W. S. EDGE ET AL     2,686,578

NAIL RETAINING MEANS FOR WIRE STRUCTURAL MEMBERS

Filed April 17, 1948

INVENTORS
Walter S. Edge
Alfred J. Edge
BY Alfred R. Fuchs
Attorney

Patented Aug. 17, 1954

2,686,578

UNITED STATES PATENT OFFICE 2,686,578

NAIL RETAINING MEANS FOR WIRE STRUCTURAL MEMBERS

Walter S. Edge, Kansas City, Kans., and Alfred J. Edge, Kansas City, Mo.

Application April 17, 1948, Serial No. 21,718

8 Claims. (Cl. 189—37)

Our invention relates to nail retaining means, and more particularly to nail retaining means for wire structural members.

While various means have been previously provided for securing a nail to a metallic section, such as a member made up of wires, rods, bars or similar members, all such means for holding a driven nail are of such a character that the nail is forced to follow a crooked path in being driven and becomes bent or offset in the driving process. It is the changed profile that gives it its holding power in such holding means, and in such holding devices the nail that has been driven has either less holding power than a nail driven into wood or approximately the holding power of a nail driven into wood.

It is a particular purpose of our invention to provide holding means for a driven nail in a wire structural member in which the nail is not bent during the driving process in order to secure the nail to the structural member, but remains straight after it has been driven. This is accomplished in carrying out our invention by forcing the nail to enter a passage that is of less width than the diameter of the nail, preferably, a slot-like passage or framed slot. As a result the nail is flattened on both sides and develops great holding power through friction, the holding power being considerably greater than that of the same nail driven into wood.

It is a further purpose of our invention to provide steel framework members that are of the proper rigidity and spacing to provide the slot-like passage of proper proportions, and which has walls made up of such structural wire members that are of sufficient rigidity that the slot for receiving the nail will not be widened or spread by the nail driven into the same, but instead the nail will be flattened by such driving action. The diameters of the longitudinal members that form the slot walls must have such a relationship to their clear span length that the longitudinal members will not be deflected when the nail is driven in. Not only in this necessary in order that the nail have the proper holding properties, but if the structural members were deflected due to the driving of the nail and these were also in compression, as for example, due to bending in a joist, the longitudinal members forming the walls of the slot would be seriously weakened and would not perform the function for which they are designed and thus would cause the joist, or other member of which they are a part, to not perform as intended.

More specifically it is a purpose of our invention to provide nail retaining means for structural members for a light steel framing made up of wire members, which nail retaining means does not increase the weight or cost of said structural members materially and which does not decrease the strength of said structural members, but which will facilitate the attachment of such materials as wood floors, metal lath, wood sheathing, or other wood members thereto.

This purpose is accomplished by means of our invention by providing certain of the wire members of the wire structural member arranged at such a spacing that the space between the same provides slots that are of an exact width, such that a certain definite size nail may be driven through the material or materials that are to be attached to the structural members and into and through the slot, the wall forming members of the slot being of such strength that the nail is flattened as it enters the slot and thereby develops a very powerful frictional grip between said slot wall forming members and the nail.

In removing nails from ordinary materials into which nails are driven, such as wood, it is a well known fact that the starting pull always is greater than that required to pull the nail out. In contradistinction to this our improved nail holding means provides a grip on the nail that is of such a character that the starting pull required and the pull required to continue the removing of the nail is practically constant, thus providing a much stronger hold between the nail and the structural member than is possible where wood or material equivalent to wood is used.

The proper spacing of the members that form the walls of the slot into which the nail enters is maintained either by means of transverse structural members or by means of spacing members inserted between a pair of parallel structural members and fixed in position therebetween in carrying out our invention. While our invention is particularly adapted for use with common nails, it is also adapted for use with other types of nails and with screws, and is particularly useful with self-threading sheet metal screws, as these provide the strongest connection between the headed fastening element and the structural member.

Other objects and advantages of our invention will appear as the description of the drawings proceeds. We desire to have it understood, however, that we do not intend to limit ourselves to the particular details shown or described, except as defined by the claims.

Figure 1:
Fig. 1 is a top plan view of a joist provided with a plurality of nailing slots or channels.
Figure 3:
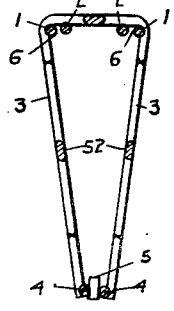
Fig. 3 is a vertical sectional view through the joist shown in Fig. 2.
Figure 2:
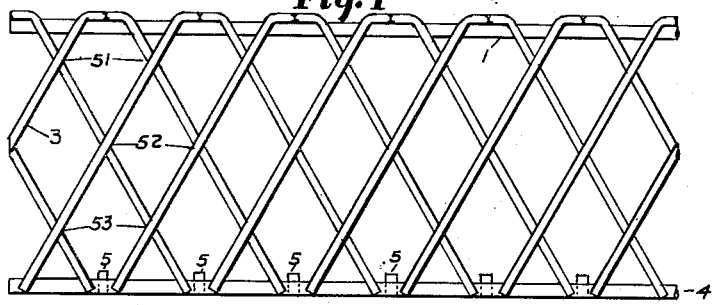
Fig. 2 is a side elevational view thereof.

Referring in detail to the drawings, in Figs. 1 to 3, is shown one form of structural member having the nail retaining means made in accordance with our invention. In Figs. 1 to 3, inclusive, a joist is shown, which is generally triangular in cross section and which has a pair of outer longitudinally extending chords 1 and a pair of inner longitudinally extending chords 2, which may be made of wire or similar material and, preefrably, of wire. Said longitudinal extending chord members 1 and 2 are connected in fixed position to transversely extending members 3, which are also, preferably, of wire, said members 3 extending obliquely across the top of the joist and crossing each other so as to provide intersections between said members 3 at 50. Preferably, the obliquely extending members 3 are secured together at their intersections, as by welding, and said oblique transversely extending members 3 are also secured to the longitudinally extending members 1 and 2 where said transversely extending members 3 intersect said members 1 and 2. The members 1 and 2 are spaced accurately a predetermined distance from each other and are held in such spaced relationship by the transversely extending members 3. The members 3 also extend down the converging side portions of the joist and intersect at a plurality of points, such as at 51, 52 and 53, the particular number of intersections being variable as may be found desirable to provide the desired web portion for the joist and are, preferably, welded to each other at their intersections, such as the intersections 51, 52 and 53.

The extremities of the obliquely extending transverse members 3 are connected together by longitudinally extending lower chords 4, being welded thereto at their points of engagement. A pair of the lower chords 4 is provided and said chords 4 are, preferably, made of wire or similar material and are spaced a predetermined distance from each other by means of spacing members 5, which are interposed between said longitudinally extending chords 4 so as to space said members 4 a predetermined distance from each other. The spacing members 5 are short pieces of wire or rod welded to the chords 4.

A pair of slots or channels 6 is thus provided between the members 1 and 2, which constitute nail retaining slots or channels whereby it is possible to nail or otherwise fasten collateral material, such as wood sub-flooring, sheathing, metal lath, wall board, or similar material, to the joist, it being possible to nail or secure these materials to the top end of the joist along both or either side edge thereof as may be found desirable. By providing the pair of longitudinally extending chord members 4 and the spacing members 5 between the same, a slot or channel 54 is provided between the same, by means of which such collateral materials as above referred to can be secured to the under side of the joist, by nails or other similar headed fastening elements. The slots or channels 6 and 54 are narrower than the diameter of the nail or other headed fastening element that is to be used for securing the collateral material to the joist.

Figure 10:
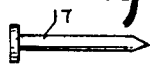
Fig. 10 is a view in side elevation of an ordinary nail before being driven into the nailing slot or channel of one of our joists.
Figure 11:
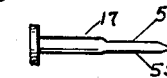
Fig. 11 is a similar view of the nail after having been driven into such a nailing channel and withdrawn.
Figure 12:
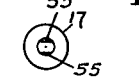
Fig. 12 is an end view of the nail shown in Fig. 11.

As a result, when a nail such as the nail 17 shown in Fig. 10, which is of proper size for driving into the channel or groove 6 or 54, is driven into said slot or channel, the nail will be changed in cross sectional shape by the driving force so as to become somewhat flattened as shown at 55 in Fig. 11 and Fig. 12. As a result the nail, instead of being circular in cross section, becomes approximately rectangular in cross section over the portion thereof that is forced between the chord members that form the walls of the channels above referred to. This will cause the headed fastening elements to be very tightly gripped by the chords that form the walls of the slot or channel. It will be obvious upon reference to Figs. 1, 2 and 3 that by placing the spacing members 5 close together and having the obliquely extending members 3 intersecting the longitudinally extending members 1 and 2 at closely spaced points the span length of the longitudinal members between the obliquely extending transverse bracing members will be very short and there will be thus great resistance to any tendency for the longitudinally extending chord members to be bent out of their straight parallel relationship by forcing the nails or other fastening elements between the same.

While the joist is above described as having the longitudinal chord members 1 and 2 at the top thereof and the chord members 4 at the bottom thereof, such a joist can be inverted so that the chord members 4 are at the top and the chord members 1 and 2 at the bottom thereof and the same results as to the effectiveness of the nailing slots or channels obtained. Also it may be desirable to provide a nail retaining slot or channel at the center of the transversely extending web portion made up of the obliquely extending members 3 instead of providing a pair of such channels or slots, such as above described.

Figure 5:
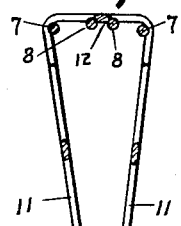
Fig. 5 is a vertical section through the joist shown in Fig. 4.
Figure 4:
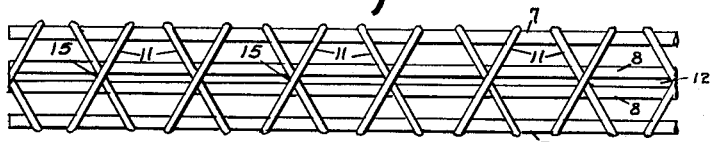
Fig. 4 is a plan view of a slight modification.

Such an arrangement is shown in Figs. 4 and 5 in which the pair of outer chords 7 is provided at the bends in the obliquely extending members 11, which are similar to the members 3 previously described. A pair of longitudinally extending wire members 8 is also provided in the upper transverse portion of the joist on opposite sides of the longitudinal center line thereof, said wires 8 being, preferably, spaced equal distances from said center line. In the arrangement shown in Figs. 4 and 5 the obliquely extending members 11 intersect on the center line of said transversely extending web portion, said intersection being indicated by the numeral 15 and, preferably, said members 11 are welded or otherwise rigidly secured to each other at their intersections. The members 8 are spaced a predetermined uniform distance from each other throughout their length and are held in such spaced relation by the obliquely extending members 11 which are, preferably, welded or otherwise rigidly secured to the members 8 at all points of intersection thereof. The extremities of the obliquely extending members 11 are secured rigidly to longitudinally extending chord members 9, which are similar to the chord members 4, and which are spaced a uniform predetermined distance apart by means of spacing members 10, which are similar to the spacing members 5 previously described and serve the same purpose, being fixed to the members 9 by welding or in a similar manner. Channels or slots are thus provided that serve the same purpose as the channels or slots 6 and 54 previously described, the channel between the longitudinally extending members 8 being indicated by the numeral 12 in Figs. 4 and 5.

Figure 6:
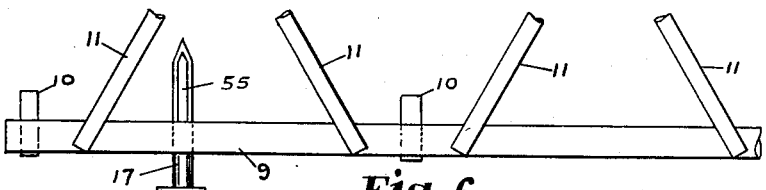
Fig. 6 is a fragmentary side elevational view of the bottom chords of a joist, such as that shown in Fig. 5, on a larger scale than Fig. 5, showing a nail driven into the nailing slot or channel.
Figure 7:
Fig. 7 is a fragmentary bottom plan view of the structure shown in Fig. 6.

In Figs. 6 and 7 the lower end portion of the structure shown in Fig. 5 is illustrated on a larger scale to more clearly show the operation of the nail retaining slot or channel, said slot or channel being indicated by the numeral 56 in Fig. 7. It is, of course, to be understood that the diagonally or obliquely extending members 11 are fixedly secured to the longitudinally extending members 9 at their engaging portions, as by welding. One of the nails 17 is shown as having been driven into the slot or channel 56 and engagement of the nail with the walls of said slot or channel formed by the longitudinally extending members 9 causes the flat portions 55 to be formed on the nail, as above described, the longitudinally extending chord members 9 being, preferably, of a high tensile strength steel, which will act in a similar manner to a die in changing the cross sectional shape of the nail 17 as it is forced into the slot 56. This causes the nail to be very tightly frictionally gripped by the members 9. It is, of course, to be understood that all of the longitudinally extending members 1, 2, 4, 8 and 9 above described, are made of similar material and will have great resiliency and strength as compared with the material of the nails or other headed fastening elements used for securing collateral materials to the joist or similar structural member to which our invention is applied.

Figure 8:
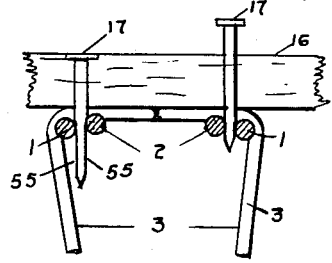
Fig. 8 is a fragmentary view partly in elevation and partly in section, on a somewhat larger scale than Fig. 3, showing a joist such as that shown in Figs. 1 to 3, inclusive, with a piece of wood such as sub-flooring, nailed thereto.
Figure 9:
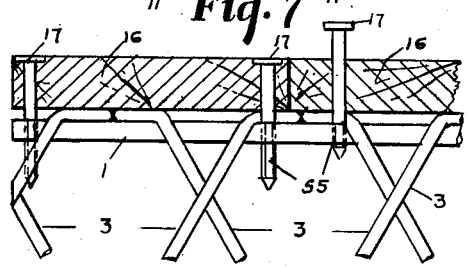
Fig. 9 is a fragmentary side elevation of the structure shown in Fig. 8.

In Figs. 8 and 9 sub-flooring 16 is shown as being fastened to the upper end of the joist shown in Figs. 1 to 3, inclusive, by driving nails 17 between the chord members 1 and 2, which are held in fixed relationship to each other by means of the obliquely extending members 3, as previously described. The nail 17 has the appearance shown in Fig. 10 before being driven, and has the appearance shown in Fig. 11 after having been driven and removed from the structure, the driving resulting in the flats 55 being formed as above described. At the right of Fig. 8 a nail 17 is shown as being partly driven into the sub-flooring and into the retaining slot or groove 6, and also a nail 17 is shown in this position in Fig. 9.

By the use of the joists shown in Figs. 1 to 5, inclusive, it has been found that the strength of such joists has been greatly increased when used in an inverted position from that shown in Figs. 3 and 5, over what would be the case if instead of pairs of longitudinal members providing nail retaining means, only single longitudinal wires at the places where the wires 1 and 2 are located were used, while at the same time the nail retaining means is provided. Thus efficiency and economy results by the use of such structural members as shown in Figs. 1 to 5, inclusive. Among the advantages of the paired wire construction shown in Figs. 1 to 3, inclusive, is the fact that the lateral stiffness of the joist is increased very materially over a joist in which single instead of paired wires are used in substantially the same positions.

What we claim is:

1. A metallic structural member having a pair of legs, a transverse portion connecting said legs, and means connecting the extremities of said legs remote from said transverse portion said member comprising a plurality of pairs of closely adjacent parallel spaced longitudinal high tensile strength chord wires defining fastening element retaining slots and transversely extending wires intersecting and rigidly secured to said longitudinal wires, said transversely extending wires extending at an oblique angle to said longitudinal wires and intersecting between said longitudinal wires, one of said pairs of slot defining longitudinal chord wires including a wire adjacent the extremity of each of said legs remote from said transverse portion, the means connecting said extremities of said legs comprising spacing means for said last mentioned pair of chord wires.

2. A metallic structural member having a pair of converging legs, a transverse portion connecting said legs, and means connecting the converging extremities of said legs remote from said transverse portion, said member comprising a plurality of pairs of closely adjacent parallel spaced longitudinal chord members having convexly curved surfaces defining fastening element retaining slots and transversely extending members intersecting and rigidly secured to said longitudinal members, one of said pairs of longitudinal slot defining chord members including a member adjacent the the converging extremity of each of said legs, the means connecting said extremities of said legs comprising spacing means for said pair of chord members and another pair thereof in said transverse portion, said transversely extending members extending across said last mentioned pair of slot defining members.

3. A metallic structural member triangular in cross section having a pair of converging legs and a transverse portion, comprising a plurality of pairs of closely adjacent parallel spaced longitudinal chord wires of high tensile strength steel defining fastening element retaining slots and transversely extending members intersecting and rigidly secured to said longitudinal wires, one of said pairs of wires being at the apex of said structural member and each wire of said pair in a marginal portion of a leg and rigid members mounted between and fixed to the wires of said last mentioned pair to rigidly connect said legs and space said wires.

4. A metallic structural member triangular in cross section having a pair of converging legs and a transverse portion, comprising a plurality of pairs of closely adjacent parallel spaced longitudinal chord wires defining fastening element retaining slots and transversely extending members intersecting and rigidly secured to said longitudinal wires, one of said pairs of wires being at the apex of said structural member and rigid members mounted between and fixed to the wires of said last mentioned pair to rigidly connect said legs and space said wires, and another pair of said wires being at the base of said triangle, said transversely extending members extending across said other pair of wires.

5. A metallic structural member triangular in cross section having a pair of converging legs and a transverse portion, comprising a plurality of pairs of closely adjacent parallel spaced longitudinal chord wires defining fastening element retaining slots and transversely extending members intersecting and rigidly secured to said longitudinal wires, one of said pairs of wires being at the apex of said structural member and rigid members mounted between and fixed to the wires of said last mentioned pair to rigidly connect said legs and space said wires, and two pairs of said longitudinal wires being symmetrically arranged at the base of said triangle, said transversely extending members extending across the wires of both of said symmetrically arranged pairs.

6. A metallic structural member, comprising a plurality of parallel longitudinal members including a pair of closely adjacent parallel spaced longitudinal chord wires of high tensile strength steel defining a fastening element retaining slot and means for holding the members of said pair against spreading out of parallelism, comprising transversely extending wires extending across said pair of chord wires at short intervals and rigidly secured thereto.

7. A metallic structural member having a transverse portion and a pair of converging legs extending from said transverse portion, said structural member including a plurality of longitudinal chord wires and transversely extending wires intersecting said longitudinal wires, said wires being rigidly secured together at said intersections, said longitudinal wires including a pair of longitudinal wires at the converging extremities of said legs, and spacing members interposed between said pair of longitudinal wires at spaced intervals along the same and welded to both wires of said pair to secure the extremities of said legs to each other to form a member of closed triangular section.

8. A wire fabric structural member having a transverse portion and a pair of converging legs extending therefrom, the wire fabric body portion of said member comprising a pair of marginal longitudinal members at the convergent extremities of said legs and a pair of inner longitudinal members at the junctions of said legs and transverse portion, all said longitudinal members being parallel to each other, and obliquely extending members intersecting all said longitudinal members, said obliquely extending members comprising a set of parallel members extending at a predetermined oblique angle to said longitudinal members and a set of parallel members extending at the opposite oblique angle to said longitudinal members, each obliquely extending member of one of said sets intersecting an obliquely extending member of the other set in each of said legs at a point spaced from the inner longitudinal member therein and another obliquely extending member of the other set at a point spaced from the marginal longitudinal member therein, the obliquely extending members of one of said sets intersecting the longitudinal members in spaced relation to the intersection of the members of the other of said sets with said longitudinal members, all said members being welded to each other at all said intersections, and spacing members interposed between said pair of marginal longitudinal members at spaced intervals along the same and welded to both members of said pair to secure the convergent extremities of said legs to each other to form a member of closed triangular section.

References Cited in the file of this patent

UNITED STATES PATENTS

| Number | Name | Date |
|---|---|---|
| 893,792 | Gabriel | July 21, 1908 |
| 1,614,570 | Pawling | Jan. 18, 1927 |
| 1,680,976 | Frease | Aug. 14, 1928 |
| 2,126,962 | Hurlbert | Aug. 16, 1938 |
| 2,241,617 | Rubin | May 13, 1941 |
| 2,309,823 | Bowman | Feb. 2, 1943 |
| 2,465,074 | Edge | Mar. 22, 1949 |

FOREIGN PATENTS

| Number | Country | Date |
|---|---|---|
| 4,579 | Great Britain | of 1910 |
| 262,336 | Germany | of 1913 |
| 15,661 | Australia | of 1929 |